(12) United States Patent
Wagner et al.

(10) Patent No.: US 10,432,423 B2
(45) Date of Patent: Oct. 1, 2019

(54) METHOD, DEVICE, AND COMPUTER PROGRAM FOR OPERATING A DATA PROCESSING SYSTEM

(71) Applicant: Robert Bosch GmbH, Stuttgart (DE)

(72) Inventors: Marco Andreas Wagner, Leonberg (DE); Michael Poehnl, Wurmberg (DE); Timo Lothspeich, Weissach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/756,813

(22) PCT Filed: Aug. 2, 2016

(86) PCT No.: PCT/EP2016/068401
§ 371 (c)(1),
(2) Date: Mar. 1, 2018

(87) PCT Pub. No.: WO2017/036706
PCT Pub. Date: Mar. 9, 2017

(65) Prior Publication Data
US 2018/0278436 A1    Sep. 27, 2018

(30) Foreign Application Priority Data
Sep. 3, 2015   (DE) ........................ 10 2015 216 886

(51) Int. Cl.
*H04L 12/413*   (2006.01)
*H04L 12/40*   (2006.01)

(52) U.S. Cl.
CPC .... *H04L 12/4135* (2013.01); *H04L 12/40163* (2013.01); *H04L 12/413* (2013.01); *H04L 2012/40215* (2013.01)

(58) Field of Classification Search
CPC .......... H04L 12/4135; H04L 12/40163; H04L 12/413; H04L 2012/40215
See application file for complete search history.

(56) References Cited

U.S. PATENT DOCUMENTS

| | | | | |
|---|---|---|---|---|
| 4,500,960 A | * | 2/1985 | Babecki | .................. H04L 69/24 710/100 |
| 6,651,106 B1 | * | 11/2003 | Driscoll | .............. H04L 12/1854 709/230 |

(Continued)

FOREIGN PATENT DOCUMENTS

| | | |
|---|---|---|
| EP | 1956794 A2 | 8/2008 |
| JP | 2015114907 A | 6/2015 |

OTHER PUBLICATIONS

International Search Report dated Oct. 10, 2016, of the corresponding International Application PCT/EP2016/068401 filed Aug. 2, 2016.

*Primary Examiner* — Duc C Ho
(74) *Attorney, Agent, or Firm* — Norton Rose Fulbright US LLP; Gerard Messina

(57) ABSTRACT

A method, a device, and a computer program for operating a data processing system, including at least two nodes that are connectable via a data line for transmitting messages. A message includes an identifier for arbitrating messages to be transmitted, the identifier containing—information concerning a priority via which a processing sequence of messages ready for transmission is determined, and the identifier—containing information concerning a network node, via which a sender of the message is unambiguously determined, and—containing information concerning a service, via which a service is determined.

17 Claims, 3 Drawing Sheets

(56) References Cited

U.S. PATENT DOCUMENTS

| | | |
|---|---|---|
| 2012/0127928 A1 | 5/2012 | Ichihara |
| 2013/0322449 A1 | 12/2013 | Hwang et al. |
| 2015/0358950 A1* | 12/2015 | Zhang ................. H04W 72/042 370/331 |
| 2016/0179663 A1* | 6/2016 | Roesch .................... G06F 7/58 711/103 |

* cited by examiner

METHOD, DEVICE, AND COMPUTER PROGRAM FOR OPERATING A DATA PROCESSING SYSTEM

FIELD

The present invention is directed to a method, a device, and a computer program for operating a data processing system.

SUMMARY

An example method in accordance with the present invention may allow, via technical measures, the use of service-oriented communication on a data processing system in which messages that are transmitted via a data line are arbitrated with the aid of identifiers contained in the individual messages.

It is particularly advantageous when a message arriving at a node of the data processing system is accepted into a memory of this node only when information concerning a service or information concerning a network node that is contained in the identifier determines this node as the recipient. Thus, only certain arriving messages are received. This allows the selective receipt of messages by individual nodes, in particular when messages are broadcast on the data processing system.

A node on which a service is offered or a node that uses a service thus receives messages that are relevant for the service.

When multiple network nodes offer the same service, or multiple network nodes request the service, this message may be recognized and received, regardless of the sender.

A node that is awaiting messages from a certain network node thus receives messages that are transmitted from this network node. It is thus possible to distinguish between multiple senders based on the information concerning the network node.

It is particularly advantageous when a message arriving at a node of the data processing system is accepted into the memory of this node only when the information concerning the service and the information concerning the network node determines this node as the recipient. It is thus possible to distinguish between providers of the same service, based on the transmitting node. This is advantageous in particular for data processing systems on which redundant service-oriented functions run.

Further advantageous refinements of the present invention and examplary embodiments are described below.

DETAILED DESCRIPTION OF EXAMPLE EMBODIMENTS

Figure 1:
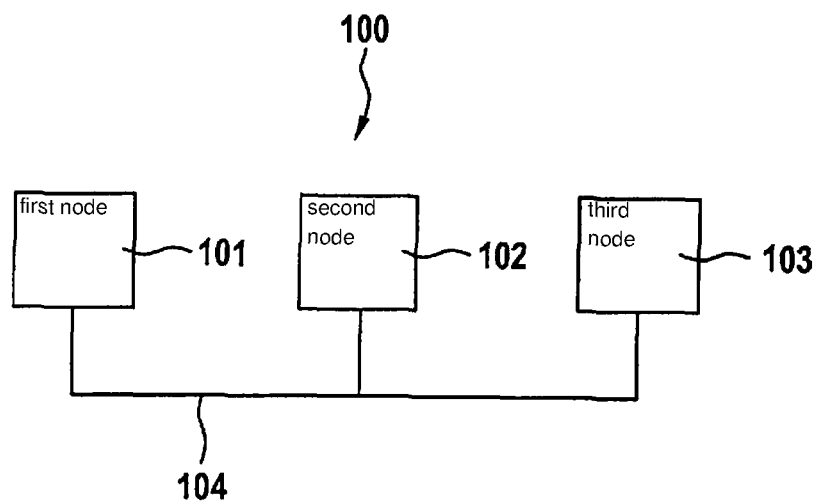
FIG. 1 schematically shows a portion of a data processing system.

A data processing system 100 schematically illustrated in FIG. 1 is described below. FIG. 1 illustrates a first node 101, a second node 102, and a third node 103. These nodes are connected via a data line 104. This means that the data processing system includes at least two nodes that are connectable via data line 104 for transmitting messages. More or fewer than three nodes may also be provided. In the example, third node 103 is an optional gateway, and may convert messages, according to a first protocol by which data processing system 100 operates, into messages according to a second protocol. For example, data processing system 100 is connectable via the gateway to another data network, not illustrated in FIG. 1.

In the example, first node 101 is a control unit A on which a user portion of a service-oriented function runs. Second node 102 in this example is a control unit B on which a provider portion of this service-oriented function runs. The service that is performed, i.e., offered or utilized, by the service-oriented function is arbitrary. The service is described by a service description according to a specified protocol, for example by text or Extensible Markup Language (XML). In the example, a piece of information concerning the service is unambiguously associated with this description. The information concerning the service is, for example, a binary, numeric, or alphanumeric term, referred to below as "short ID." This short ID is preferably unambiguously associated with a specific service that runs on a certain node.

A message that is transmittable via data line 104 includes an identifier for arbitrating messages to be transmitted. The identifier contains information concerning a priority via which a processing sequence of messages ready for transmission is determined. The identifier also contains information concerning a network node, via which a sender of the message is unambiguously determined. In the example, a node identifier MAC is used. The identifier additionally contains the information concerning the service, for example the short ID, via which the service is determined. This means that the message contains the functionality underlying the message, in particular information concerning the service provider or the service user.

Figure 2:
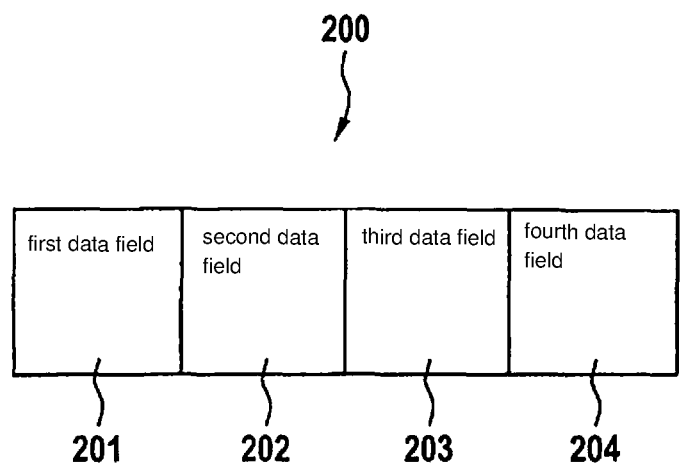
FIG. 2 schematically shows a portion of a message.

An example of an identifier 200 is schematically illustrated in FIG. 2.

Identifier 200 represents a bit sequence that is situated in a header portion of a frame of a message. The frame also contains a bit sequence of a data portion, not illustrated in FIG. 2. The frame may also include further portions that contain error correction bits, for example.

The information concerning the priority is situated in a first data field 201, for example. The information concerning the service is situated in a second data field 202, for example. The information concerning the network node, node identifier MAC in the example, is situated in a third data field 203, for example. A fourth optional data field 204 contains, for example, information concerning a message type. The data fields in identifier 200 are preferably arranged in this sequence. Other sequences are likewise possible. The length of the bit sequences in the data fields may be different or the same.

The data processing system is preferably implemented within the scope of a Controller Area Network (CAN). CAN is standardized as ISO 11898, and operates according to the carrier sense multiple access/collision resolution method, in which during bus access, collisions are triggered by arbitration as a function of a CAN specific identifier. This identifier has, for example, a predefined length, in particular a length of 11 bits in the base frame format, or 29 bits in the extended frame format.

The length of the bit sequence that indicates the priority, the length of the bit sequence that reflects the information concerning the service, the short ID in the example, the length of the bit sequence that reflects the information concerning the network node, node identifier MAC in the example, and optionally the length of the bit sequence that indicates the message type are preferably selected in such a way that in combination, a total length of identifier 200 of 11 bits or 29 bits results.

The information concerning the network node, i.e., node identifier MAC in the example, preferably unambiguously identifies a sender. In contrast to a previously defined communication matrix, in which the content of the message, not a device identification, is associated with the aid of object identifiers, a dynamic adaptation to a changed architecture of data processing system 100 is thus possible in an automated manner. A static communication matrix must be specified with knowledge of all previously statically defined senders and all awaited messages. All nodes of the network must have complete information, or at least information about the portions of the communication matrix that are relevant for them, to be able to meaningfully detect arriving messages.

Portions of a method for operating data processing system 100, which makes reliable service-oriented communication possible also for dynamic changes, are described below.

The messages described below are broadcast via data line 104 in the example. This means that a transmitted message is receivable by all nodes of data processing system 100 that are connected to data line 104.

The processing sequence of messages ready for transmission is preferably determined as a function of the priority. The processing sequence is established, for example, as a function of the association of the information concerning the priority with a predefined priority or a predefined priority class.

The processing sequence of messages ready for transmission having the same priority is preferably determined as a function of the information concerning the service, as a function of the short ID in the example. For this purpose, the processing sequence is established, for example, as a function of an association of the information concerning the service, as a function of the short ID in the example, with a predefined priority or a predefined priority class.

If identifier 200 includes information concerning a message type, the processing sequence of messages ready for transmission having the same priority and the same information concerning the service may also be determined as a function of the message type. For this purpose, an association of predefined message types with a predefined priority or predefined priority class is established.

These associations with the particular priorities are stored, for example, in a list, preferably in a node. A node is designed for transmitting the messages on data line 104 according to their associated priority. The list is preferably stored on each node of data processing system 100. Each node of the data processing system preferably transmits each message according to its associated priority.

The priority according to the CAN protocol is preferably used as information concerning the priority in the message. The access to data line 104 is thus preferably determined according to the CAN protocol.

Figure 3:
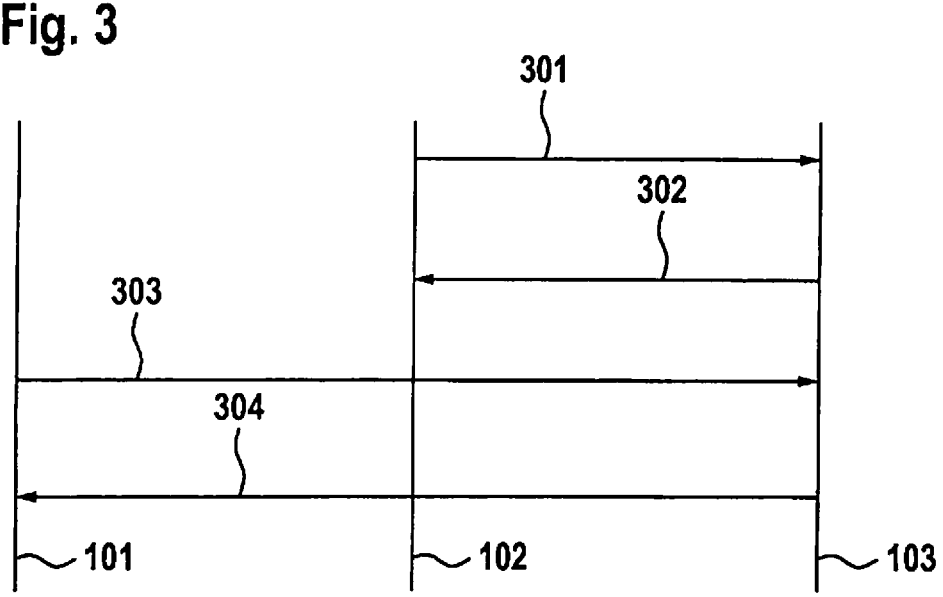
FIG. 3 schematically shows a first signal flow chart.

FIG. 3 schematically shows a first signal flow chart according to one method portion for assigning or for requesting information concerning a service. In the example, the short ID is assigned or requested.

For registration of a service-oriented function, the provider portion of the service-oriented function transmits a message 301, register.

In the example in FIG. 3, the provider portion of the service-oriented function runs on second node 102. In this example, message 301 is transmitted from second node 102.

For registration of the service-oriented function, message 301, register, is received by at least one node.

In the example in FIG. 3, services are centrally managed in third node 103 in data processing system 100. In the example, the function for the management runs on third node 103. A decentralized management may also be provided. In this case, the management takes place in each node or in multiple nodes of data processing system 100.

For managing the information concerning the services that are available in data processing system 100, for example a list, table, database, or the like is provided in which information concerning the service is associated with a description of the service. In the example, this association is stored on third node 103. In the example, a specific short ID is unambiguously associated with a description of the service. For example, a predefined protocol is used for describing the service. A source language, for example text or Extensible Markup Language (XML), is used in the example.

Other forms of the description of a service, for example the indication of a socket according to the Transmission Control Protocol/Internet Protocol (TCP/IP), are likewise possible. The information concerning the service may also correspond, for example, to a service description (long ID) of an IP-based protocol. The length of the short ID, in particular the length of the bit sequence that represents the short ID in identifier 200, is preferably shorter than the length of the service description (long ID). It is also possible via the gateway to obtain from third node 103 a service description (long ID) of a service from outside data processing system 100. For this purpose, the gateway optionally converts an external message into message 301.

In the example, it is provided to transmit the description of the service in message 301, register, preferably in the data portion. Alternatively or additionally, it may be provided to transmit the description of the service in another message or multiple other messages (not illustrated).

Upon receipt of message 301, register, the information concerning the service is associated with the description of the service. In the example, a short ID is generated and is associated with the description. If an association with a short ID already exists for the received description, this association is used. A bit sequence having a predefined length, for example 4 bits or 2 bits, preferably 8 bits, is preferably used as the short ID.

The information concerning the service, the short ID in the example, is transmitted in a message 302, register ACK, preferably in the data portion of message 302. Successful registration is acknowledged by message 302, register ACK. In the example, third node 103 transmits message 302. Second node 102 receives message 302.

For requesting a service-oriented function, a user of a service transmits a message 303, WhoIs. In the example, it is provided to transmit the information concerning the service, for example the short ID, in message 303, WhoIs, preferably in the data portion of message 303. For example, a node that requires a description of a service transmits message 303, WhoIs, in order to receive the description of the service.

In the example in FIG. 3, the user portion of the service-oriented function runs on first node 101. In this example, message 303 is transmitted by first node 101.

First node 101 on which a user portion of a service-oriented function runs preferably ascertains this short ID from an identifier 200 of a message arriving at first node 101. If this short ID is unknown, message 303 is transmitted.

For requesting the service-oriented function, message 303, WhoIs, is received by at least one node.

In the example in FIG. 3, services are centrally managed in third node 103 in data processing system 100. In the example, the function for the management runs on third node 103. In this case, third node 103 receives message 303, WhoIs.

A decentralized management may also be provided. In this case, the management takes place in each node or in multiple nodes of data processing system 100 that receive message 303, WhoIs.

Upon receipt of message 303, WhoIs, the description of the service that matches the information concerning the service contained in message 303, WhoIs, is ascertained from the association. In the example, the short ID is ascertained from message 303, WhoIs. The description associated with the short ID is then ascertained.

The ascertained description is transmitted in a message 304, WhoisACK. In the example, the description of the service is transmitted according to the predefined protocol. For example, the source language, for example text or Extensible Markup Language (XML), is used. The socket according to the Transmission Control Protocol/Internet Protocol (TCP/IP) or the service description (long ID) of an IP-based protocol may also be used.

It may be provided to transmit the description of the service in message 304, register, preferably in the data portion of message 304. Alternatively or additionally, it may be provided to transmit the description of the service, preferably in the data portion, in another message or multiple other messages (not illustrated).

In the example, third node 103 transmits message 304. First node 101 receives message 304. It may also be provided to exchange messages 302, 303, and 304 with an external node via the gateway. The gateway appropriately converts the particular messages for this purpose.

A short ID is preferably not assigned twice. A node may then at any time unambiguously request the complete service description of a certain provider of a service, which is associated with the short ID.

Figure 4:
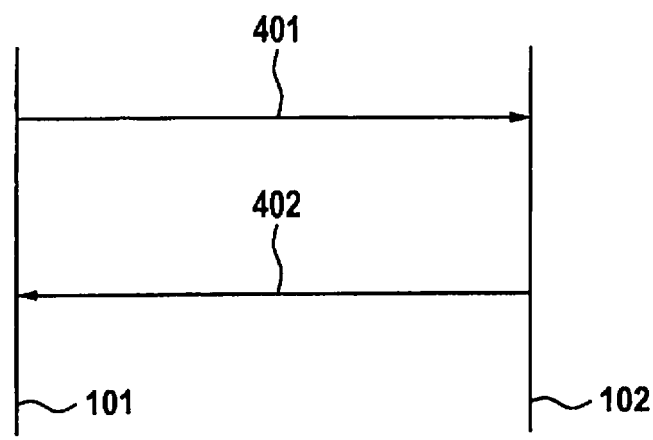
FIG. 4 schematically shows a second signal flow chart.

FIG. 4 shows a second signal flow chart that schematically illustrates the service-oriented communication patterns publish/subscribe, request/response, and discovery, i.e., find/offer.

Service-oriented functions may be easily represented on data processing system 100 due to the introduction of the service-oriented communication patterns.

The request/response method is used primarily for one-time data requests, or a request in the sense of a remote procedure call.

The publish/subscribe method is used within the scope of a 1:n scenario and for long-term subscriptions to certain data. A 1:n scenario is present when a node transmits a message for many recipients.

The message types "request," "response," "subscribe," "publish," and "unsubscribe" are provided for the publish/subscribe method. As a message type, for example as a correspondingly coded bit sequence, they are added to the message in the fourth field of the identifier, depending on the type of message. The service "discovery," which is required for representing dynamic communication paths and which allows finding and providing services, is similarly implemented in the form of the defined message types "find/offer."

The provider portion of the service-oriented function runs on second node 102 in the example in FIG. 4. First node 101 is the user of the service. In this case, first node 101 transmits a message 401 to second node 102. Message 401 is generated by the user portion of the service-oriented function, for example. For example, a message 401 of the message type "request," "subscribe," "unsubscribe," or "find" is generated.

First node 101, in particular the user portion of the service-oriented function, is designed for determining the message type of message 401 corresponding to the desired service. A bit sequence having a predefined length, for example 4 bits or 2 bits, preferably 8 bits, is preferably used as the message type. The stated message types are unambiguously associated in each case with one of these bit sequences, for example.

Second node 102 is designed for determining the desired service from a received message 401, corresponding to the message type.

Upon receipt of message 401, for example the provider portion of the service-oriented function is informed that the service is requested.

The response by the service is generated by the provider portion of the service-oriented function, depending on the service desired. In the example, a message of the message type "response," "publish," or "offer" is generated.

In the example in FIG. 4, second node 102 transmits a message 402 to first node 101 as a response. Message 402 is, for example, the message of the message type "response," "publish," or "offer." A bit sequence having a predefined length, for example 4 bits or 2 bits, preferably 8 bits, is preferably used as the message type. The stated message types are unambiguously associated in each case with one of these bit sequences, for example.

Upon receipt of message 402, for example the user portion of the service-oriented function is informed that the service is available.

A recognition of the addition or deletion of at least one node of the at least two nodes preferably triggers transmission of the information concerning the service, in particular the short ID. In this way an automatic service, discovery, is carried out in data processing system 100.

Alternatively or additionally, the recognition of a predefined state at a node may trigger transmission of the information concerning the service. For example, these states of the services are recognized based on the data types of incoming or outgoing messages. In particular the data types "publish," "subscribe," "unsubscribe," "request," "response," "find," or "offer" may be evaluated for determining the state. Services that are to be started or ended are preferably recognized in this way.

Figure 5:
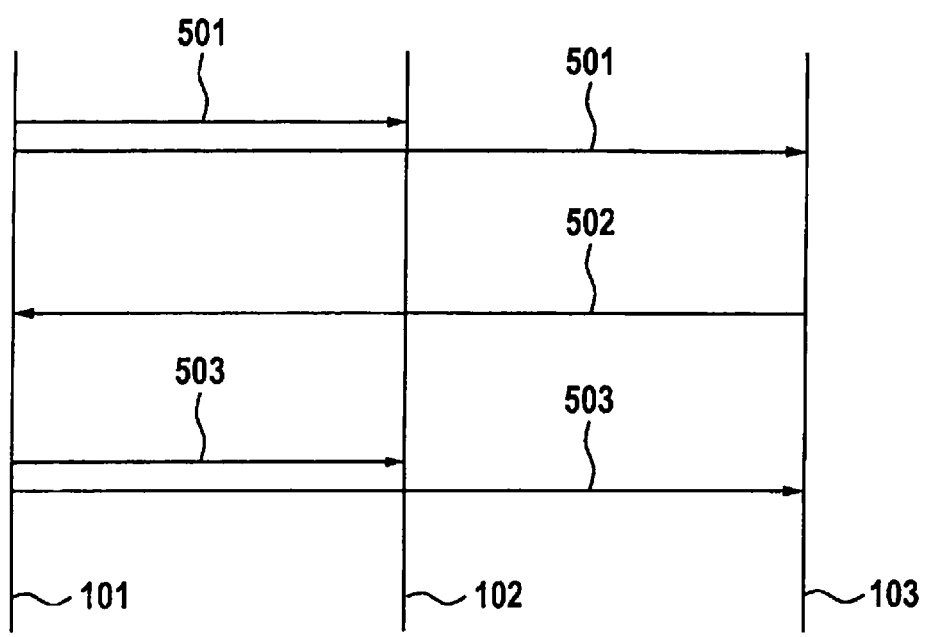
FIG. 5 schematically shows a third signal flow chart.

FIG. 5 schematically shows a third signal flow chart of a method portion in which information concerning the network node is associated with a node. In the example, node identifier MAC is associated with first node 101.

In data processing system 100, the node is thus recognizable by the recipient as the sender of a message with information concerning the network node that is contained in identifier 200.

This means that information concerning the network node with which a sender is associated is transmitted to at least one of the at least two nodes. In the example, node identifier MAC is used for this purpose. The information concerning the network node, in particular node identifier MAC, is for example a bit sequence that is pseudorandomly generated or taken from a predefined list of bit sequences. A bit sequence having a predefined length, for example 4 bits or 2 bits, preferably 8 bits, is preferably used.

For example, a node identifier "bully algorithm" is used according to the CAN protocol, employing broadcasting.

In the example, first node 101 transmits a message 501, request MAC. Message 501 is preferably transmitted in the broadcast. The information concerning the network node, node identifier MAC in the example, is transmitted in message 501.

Second node 102 and third node 103 receive message 501. Second node 102 and third node 103 analyze message 501 and ascertain the information concerning the network node, in particular node identifier MAC.

A node that has already used this node identifier MAC recognizes the double usage and responds with a message 502, deny MAC.

Alternatively or additionally, the management of the information concerning multiple network nodes may be provided on a node. For example, a list of currently assigned node identifiers MAC is stored on a node. In this case, this node recognizes the double usage and transmits message 502, deny MAC. This prompts first node 101 to select a different node identifier MAC. In this way, an unambiguous node identifier MAC is centrally or decentrally assigned to a node.

If a double usage of the information concerning the network node has been recognized, a repetition of the steps for ascertainment and association is preferably provided until the association is successful. This is the case, for example, after a predefined time period elapses. The duration of this time period is, for example, 0 min-1 min, 0 ms-100 ms, 0 ms-10 ms, 0 ms-5 ms, preferably less than 100 ms, less than 10 ms, or less than 5 ms.

In the example, a further message 503, request MAC, having a different node identifier MAC is transmitted.

A recognition of the addition or deletion of at least one node of the at least two nodes preferably triggers transmission of the information concerning the network node, in particular node identifier MAC. In this way, data processing system 100 is adapted to dynamic communication paths in an automated manner. One node is designed, for example, for generating a message 501 upon switch-on. One node is designed, for example, for transmitting a message for enabling its node identifier MAC upon switch-off.

Alternatively or additionally, the recognition of a predefined state at a node may trigger transmission of the information concerning the network node, in particular node identifier MAC.

Messages 301-304, 401, 402, and 501-503 may be CAN protocol messages. In this case, the identifier that is predefined by the CAN protocol is provided for arbitration. The described additional bit sequences are then contained in the data portion of the message according to CAN protocol.

The processing of arriving messages is described below, using an example. An arriving message includes identifier 200. One node of data processing system 100 is designed for generating messages that include this identifier 200. Another node is designed for detecting messages that include this identifier 200. These types of messages, in particular when carrying out service-oriented functions on data processing system 100, are exchanged between respective provider portions and user portions of the service-oriented function. Useful data of the service-oriented function are contained, for example, in the data portion of an exchanged message. These useful data depend on the function, and may include arbitrary bit sequences. The exchanged messages, except for identifier 200 in particular, may be structured in exactly the same way as messages according to the CAN protocol. The message exchange, except for specific differences due to identifier 200, preferably takes place in the same way as the message exchange according to CAN protocol.

A detected identifier 200 is analyzed according to data fields 201, 202, 203, 204. As a function of the bit sequence of second data field 202, i.e., as a function of the information concerning the service, it is ascertained whether the detecting node is a recipient of the message.

It is particularly advantageous when the information used concerning the service, the short ID in the example, in addition unambiguously identifies a node. In this case, an arbitration with the aid of the information concerning the service is easily possible.

If the detecting node is recognized as the recipient of the message, the arriving message, in particular the data portion of the message, is accepted into a memory of the detecting node.

In the example, for the analysis a list is provided that contains the information concerning the services whose recipient is the node in question. This means that the information concerning the service is associated with the information concerning the recipient.

In the example, this association, in particular the list, is stored on the node in question. This means that on at least one of the at least two nodes, a list is provided that associates a recipient with the information concerning the service.

A message arriving at a node is thus preferably accepted into a memory of this node only when the information concerning the service determines that this node is the recipient. This allows the selective receipt of service-oriented messages.

In addition, a node, regardless of the sender of the message, may recognize whether or not an arriving message is to be received by the node. This allows the receipt of messages relating to a certain service, also from multiple senders or from unknown senders.

A node is thus recognizable as the recipient, based on the information concerning the service. An arriving message that is intended for a service that runs on the node that is recognized as the recipient is thus receivable, regardless of the sender.

A detected identifier 200 is preferably analyzed as a function of the bit sequence of the third data field, i.e., as a function of the information concerning the network node. It is thus ascertained whether the detecting node is a recipient of the message.

If the detecting node is recognized as the recipient of the message, the arriving message, in particular the data portion of the message, is accepted into a memory of the detecting node.

In the example, for the analysis a list is provided that contains the information concerning the network node whose recipient is the node in question. This means that the information concerning the network node is associated with the information concerning the recipient.

In the example, the association, in particular the list, is stored on the node in question. This means that on at least one of the at least two nodes, a list is provided that associates a recipient with the information concerning the network node.

In the example, the association is ascertained as a function of node identifier MAC of an arriving message.

It is particularly advantageous when a message arriving at one of the nodes is accepted into a memory of this node only when the information concerning the network node, MAC in the example, determines this node as the recipient.

This means that a message arriving at a node is accepted into a memory of this node only when the information concerning the network node determines this node as the recipient. This allows the selective receipt of messages as a function of the sender.

If the information concerning the service is ambiguous, a receiving node may thus selectively receive the message from a certain provider of a service. This is meaningful in particular for redundantly designed service-oriented functions in which multiple nodes of data processing system 100 carry out the same provider portion of a service-oriented function.

A message arriving at a node is preferably filtered as a function of identifier 200. It is particularly preferred that only messages whose identifier 200 matches a predefined identifier are forwarded to a communication stack. The load on individual nodes may thus be effectively reduced.

It is particularly preferred that the information concerning the network node, node identifier MAC in the example, or the information concerning the service, the short ID in the example, is associated with only one specific node at any time.

It is particularly advantageous when a message arriving at one of the at least two nodes is accepted into the memory of this node only when the information concerning the service, the short ID in the example, and the information concerning the network node, MAC in the example, determines this node as the recipient. In this way, an arbitration with the aid of the information concerning the network node is unambiguously possible, even when there is ambiguous information concerning the service, i.e., when multiple nodes offer the same service in data processing system 100.

A device for operating data processing system 100, including at least two nodes 101, 102, 103 that are connectable via data line 104 for transmitting the described messages, includes a processor, memory, and communication interfaces that are designed to cooperate in order to carry out the described methods. The device is made up, for example, of one or multiple control units that are connected via a data bus. Except for the described differences, the device is preferably designed according to one of the CAN specifications.

A computer program that is configured for executing the steps of one of the described methods preferably runs on nodes 101, 102, 103 or the device. Multiple cooperating subprograms preferably run on the different nodes.

What is claimed is:

1. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    filtering messages arriving at one of the nodes as a function of the identifier;
    forwarding to a communication stack only messages whose identifier matches a predefined identifier.

2. The method as recited in claim 1, wherein on at least one of the at least two nodes, a list is provided that one of: (i) associates a recipient with the information concerning the network node, or (ii) associates a recipient with the information concerning the service.

3. The method as recited in claim 1, further comprising:
    transmitting, to at least one of the at least two nodes, one of: (i) information concerning the network node, or (ii) information concerning the service.

4. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    transmitting, to at least one of the at least two nodes, one of: (i) information concerning the network node, or (ii) information concerning the service;
    recognizing an addition or deletion of at least one node of the at least two nodes for the data processing system, the recognition triggering the transmission of the information concerning the network node or of the information concerning the service.

5. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    transmitting, to at least one of the at least two nodes, one of: (i) information concerning the network node, or (ii) information concerning the service;
    recognizing a predefined state of one of the nodes, the recognition triggering the transmission of the information concerning the network node or of the information concerning the service.

6. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    wherein a description of the service according to a predefined protocol is unambiguously associated with the information concerning the service.

7. The method as recited in claim 6, wherein a processing sequence of messages ready for transmission is determined as a function of the information concerning the priority.

8. The method as recited in claim 7, wherein the processing sequence of messages ready for transmission having the same priority is determined as a function of the information concerning the service.

9. The method as recited in claim 7, wherein the identifier includes information concerning a message type, the processing sequence of messages ready for transmission having the same priority or the same information concerning the service being determined as a function of the information concerning the message type.

10. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    wherein a processing sequence of messages ready for transmission is determined as a function of the information concerning the priority;
    wherein the processing sequence is established as a function of an association of the information concerning the priority with one of a predefined priority or a predefined priority class.

11. The method as recited in claim 10, wherein a message arrives at one of the at least two nodes, and the method further comprises:
    accepting, into a memory of the one of the at least two nodes, the arrived message only when one of: (i) the information concerning the service, or (ii) the information concerning the network node, determines the one of the at least two nodes is a recipient.

12. The method as recited in claim 10, wherein a message arrives at one of the at least two nodes, and the message further comprises:
    accepting, into the memory of the one of the at least two nodes, the arrived message only when the information concerning the service and the information concerning the network node, determine the one of the at least two nodes is a recipient.

13. The method as recited in claim 10, further comprising:
    filtering messages arriving at one of the nodes as a function of the identifier.

14. The method as recited in claim 10, wherein at least one of the information concerning the network node and the information concerning the service is associated with only one specific node at any time.

15. A method for operating a data processing system, the data processing system including at least two nodes that are connectable via a data line for transmitting messages, the method comprising:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    wherein a processing sequence of messages ready for transmission is determined as a function of the information concerning the priority;
    wherein the processing sequence is established as a function of the association of the information concerning the service with one of a predefined priority or a predefined priority class.

16. A device for operating a data processing system, comprising:
    at least two nodes that are connectable via a data line for transmitting messages, wherein the device is designed to transmit a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    wherein a description of the service according to a predefined protocol is unambiguously associated with the information concerning the service.

17. A non-transitory computer-readable storage medium on which is stored a computer program for operating a data processing system, the data processing system including at least two nodes that are connectable via a data line for transmitting messages, the computer program, when executed by a processor, causing the processor to perform:
    transmitting a message including an identifier for arbitrating messages to be transmitted, the identifier containing information concerning a priority via which a processing sequence of messages ready for transmission is determined, the identifier containing information concerning a network node, via which a sender of the message is unambiguously determined, and containing information concerning a service, via which a service is determined;
    filtering messages arriving at one of the nodes as a function of the identifier; and
    forwarding to a communication stack only messages whose identifier matches a predefined identifier.

* * * * *